US006210600B1

(12) United States Patent
Zhou et al.

(10) Patent No.: US 6,210,600 B1
(45) **Date of Patent: *Apr. 3, 2001**

(54) RINSE AID COMPOSITIONS CONTAINING SCALE INHIBITING POLYMERS

(75) Inventors: Yan Zhou, Cliffside Park; Joseph Oreste Carnali, Pompton Plains, both of NJ (US)

(73) Assignee: Lever Brothers Company, division of Conopco, Inc., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/901,051

(22) Filed: Jul. 25, 1997

Related U.S. Application Data

(60) Provisional application No. 60/034,306, filed on Dec. 23, 1996.

(51) Int. Cl.[7] .......... C02F 5/10

(52) U.S. Cl. .......... 252/180; 134/25.2; 510/475; 510/476

(58) Field of Search .......... 252/180; 510/514, 510/475, 476; 134/25.2

(56) References Cited

U.S. PATENT DOCUMENTS

| | | | | |
|---|---|---|---|---|
| 5,306,429 | | 4/1994 | Wood et al. . | |
| 5,420,211 | | 5/1995 | Hughes et al. . | |
| 5,516,432 | * | 5/1996 | King et al. | 210/701 |
| 5,547,612 | * | 8/1996 | Austin et al. | 134/22.19 |
| 5,755,972 | * | 5/1998 | Hann et al. | 210/701 |

FOREIGN PATENT DOCUMENTS

| | | |
|---|---|---|
| 4415804 | 11/1995 | (DE) . |
| 561 464 | 9/1993 | (EP) . |
| 659 873 | 6/1995 | (EP) . |
| 1425343 | 2/1976 | (GB) . |
| 94/17170 | 8/1994 | (WO) . |
| 95/32271 | 11/1995 | (WO) . |

OTHER PUBLICATIONS

Synthetic Detergents in the Soap Industry, *Am. Oil. Chem.Soc.*, vol. 27, pp. 88–90, by H. C. Borghetty and R.C. A. Bergman, (1950).

Anionic Surfactant, *Surfactant Science Series*, vol. 7, p. –4 by W. N. Linfield; Date Unknown.

Kalkseifendispergatoren, *Tenside Surf. Det.*, vol. 27, pp. 159–161 by W. N. Linfield, (1990).

Polymeric Lime Soap Dispersants, *Cosmetics and Toiletries*, vol. 104, pp. 71–73 by M.K. Nagarajan, W. F. Maslar, (1989).

* cited by examiner

*Primary Examiner*—Margaret Medley
*Assistant Examiner*—Cephia D. Toomer

(57) ABSTRACT

A rinse aid composition and method of using it in a machine dishwasher is described. The composition contains a polymer having about 50 wt. % to about 99% by weight of an olefinically unsaturated carboxylic acid monomer and about 1 wt. % to about 50 wt. % of at least one monomer including a copolymerizable sulfonated monomer, copolymerizable nonionic monomer or both. The composition prevents the formation of scale in the machine dishwasher.

11 Claims, No Drawings

RINSE AID COMPOSITIONS CONTAINING SCALE INHIBITING POLYMERS

This application claims the benefit of U.S. Provisional Application Ser. No. 60/034,306 filed Dec. 23, 1996, now abandoned.

FIELD OF THE INVENTION

This invention pertains to rinse aid compositions for machine dishwashing containing scale inhibiting polymers to control calcium phosphate scale.

BACKGROUND OF THE INVENTION

The machine dishwashing process comprises washing articles in a main wash cycle and rinsing them in one or more rinse cycles. A rinse aid composition is designed for use in the final rinse step of the machine dishwashing operation, separately from the detergent composition used in the main wash cycle. The rinse aid's performance is judged particularly by its ability to prevent spot and film formation on washed articles. Rinse aid compositions usually comprise an aqueous liquid containing a low-foaming nonionic surfactant, hydrotropes and an ingredient such as citric acid that can act as a builder and a pH control agent.

For many years, sodium tripolyphosphate (STP) has been used in the main wash product for machine dishwashing operation as the primary detergency builder to sequester water hardness ions ($Ca^{2+}$, $Mg^{2+}$). However, precipitation of STP by hardness ions can occur under underbuilt conditions which arise when an insufficient amount of STP is present in high hardness water. This situation can result in calcium phosphate deposition (scaling) on washed article surfaces. The tendency of scaling with some slow-dissolving tablet main wash products is even higher because, during the course of tablet dissolution, the wash liquor can be underbuilt if relatively high levels of hardness ions are present. The dissolution profile of the tablet is such that, in the initial stages of the wash, only part of the available phosphate will be delivered to the wash water. In addition, underdosage of other forms of product, such as liquids, powders, granulates and gels, can also cause a comparable scaling problem.

A separate problem arises from wash liquor containing STP being carried over from the main wash cycle into the rinse cycle. This carry-over results in an underbuilt or supersaturated rinse water under hard water conditions, and can lead to further scale deposition on the articles or to a reduction in the ability of the rinse water to remove previous deposition. Usually, there is a build up of scale and this deposition causes an objectionable filming, especially on glassware surfaces. Increasing temperature and water hardness increases scaling dramatically.

Regarding inhibiting scaling, U.S. Pat. No. 5,420,211 describes acid functional copolymers grafted to a polyethylene glycol backbone as detergent additives which have the property of inhibiting film formation in the main wash of machine dishwashing. However, the control of calcium phosphate scale related to underbuilt machine dishwashing conditions with an STP-built main wash product is not taught or suggested.

WO 95/32271 describes terpolymers containing carboxlic acid, 2-alkylallyl sulfonic acid and a carbohydrate derived from sugar for use in rinsing agents for dishwashing machines to prevent the formation of spots on washed articles.

DE4415804 describes terpolymers containing acrylic acid, maleic acid and vinyl alcohol and/or vinyl acetate for use in rinsing agents for dishwashing machines to prevent the formation of spots on dried crockery, glassware and cutlery.

U.S. Pat. No. 5,306,429 describes copolymers of polyamino acids as scale inhibiting agents which are said to be useful in preventing calcium phosphate scale formation when formulated in products designed for the main wash.

EP 561464 describes polyamino compounds, including polyaspartic acid and its salts, in rinse aid compositions to prevent scaling during the rinse step. However, it teaches that this rinse aid composition is particularly useful with phosphate-free main wash compositions. This qualification means that the polymer described is for inhibition of calcium carbonate scale, related to the hard water used, rather than for inhibition of calcium phosphate scale, related to underbuilt wash conditions with STP-built machine dishwashing compositions. The nature and the formation mechanism of these two types of scale are different.

EP 659873 describes an organo diphosphonic acid compound in rinse aid compositions to prevent calcium carbonate scale. Again, the control of calcium phosphate scale related to underbuilt wash conditions is not taught or suggested.

Biodegradable copolymers of itaconic acid and vinyl alcohol or vinyl acetate have been described in WO 94/17170 for incorporation in machine dishwashing and rinse aid compositions to prevent lime scale. Again, the control of calcium phosphate scale related to underbuilt wash conditions is not taught or suggested.

The prior art has not considered the calcium phosphate scale problem, especially as related to underbuilt machine dishwashing conditions arising under high water hardness. Therefore, the objectives of the present invention are the identification of scale inhibitors that are effective for inhibiting calcium/STP scale in underbuilt conditions, and particularly, the methods of their use for superior scale-inhibiting performance in machine dishwashing under underbuilt conditions.

SUMMARY OF THE INVENTION

The present invention provides rinse aid compositions containing scale inhibiting polymers for machine dishwashing to control calcium phosphate scale. The preferred polymer consists of about 50 to about 99% by wt., preferably from about 70 to about 98%, most preferably from about 75 to about 95% by wt. of an olefinically unsaturated carboxylic acid and about 1% to about 50%, preferably from 2 to 30%, most preferably from about 5 to about 25% by wt. of one or more monomer units selected from (a) copolymerizable sulfonated monomers, (b) copolymerizable nonionic monomers or (c) mixtures of (a) and (b).

The average molecular weight of the polymers ranges from about 1500 to about 250,000, preferably from about 5,000 to about 100,000.

The invention is also directed to a method of using the polymers in machine dishwashing for superior scale-inhibition performance.

DETAILED DESCRIPTION OF THE INVENTION

The compositions of the invention can be formulated in any desired form such as tablets, powders, granulates, pastes, liquids and gels. Liquid compositions are most preferred.

Scale Inhibitors

An essential component of the compositions in accordance with the invention is a scale-inhibiting copolymer. It comprises 50 to 99% by wt., preferably from 70 to 98%, most preferably from about 75 to about 95% by wt. of an olefinically unsaturated carboxylic acid monomer and 1% to 50%, preferably from 2 to 30%, most preferably from about 5 to about 25% by wt. of one or more monomer units selected from (a) copolymerizable sulfonated monomers, (b) copolymerizable nonionic monomers or (c) mixtures of (a) and (b).

The olefinically unsaturated carboxylic acid monomer for use herein is intended to include aliphatic, branched or cyclic, mono- or dicarboxylic acids, the alkali or alkaline earth metal or ammonium salts thereof, and the anhydrides thereof. Useful olefinically unsaturated acids of this class include acrylic acid comonomers typified by acrylic acid itself, methacrylic acid, ethacrylic acid, alpha-chloro-acrylic acid, alpha-cyano acrylic acid, beta methyl-acrylic acid (crotonic acid), alpha-phenylacrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, maleic acid, citraconic acid, mesaconic acid, glutaconic acid, aconitic acid,fumaric acid, and tricarboxyethylene.

For the polycarboxylic acid monomers, an anhydride group is formed by the elimination of one molecule of water from two carboxyl groups located on the same polycarboxylic acid molecule. Preferred carboxylic monomers for use in this invention are the monoolefinic acrylic acids having a substituent selected from the class consisting of hydrogen, halogen and hydroxyl groups, monovalent alkyl radicals, monovalent aryl radicals, monovalent aralkyl radicals, monovalent alkaryl radicals and monovalent cycloaliphatic radicals. As used herein, (meth) acrylic acid is intended to include acrylic acid and methacrylic acid. Preferred unsaturated carboxylic acid monomers are acrylic and methacrylic acid, more preferably acrylic acid.

Examples of sulfonate monomers (a) include, but not limited to, allyl hydroxypropanyl sulfonate ether, allylsulfonic acid, methallylsulfonic acid, styrene sulfonic acid, vinyl toluene sulfonic acid, acrylamido alkane sulfonic acid, allyloxybenzene sulfonic acid, 2-alkylallyloxybenzene sulfonic acid such as 4-sulfophenol methallyl ether, and the alkali or alkaline earth metal or ammonium salts thereof.

The copolymerizable nonionic monomers (b) are vinyl or allyl compounds selected from the group consisting of $C_1$–$C_6$ alkyl esters of (meth)acrylic acid, acrylamide and the $C_1$–$C_6$ alkyl-substituted acrylamides, the N-alkyl-substituted acrylamides and the N-alkanol-substituted acrylamides, N-vinyl pyrrolidone or any other vinyl amide. Also useful are the $C_1$–$C_6$ alkyl esters and $C_1$–$C_6$ alkyl half-esters of unsaturated vinylic acids, such as maleic acid and itaconic acid. Preferred nonionic monomers are selected from the group consisting of methyl (meth)acrylate, mono- and dimethyl maleate, mono- and diethyl itaconate, and (meth)allyl acetates, propionates and valerates. Particularly preferred is methyl methacrylate. Minor amounts of crosslinking monomers such as diallyl maleate, alkylene bisacrylamide and triallyl cyanurate may also be employed herein.

The average molecular weight of the polymers ranges from about 1500 to about 250,000, preferably from about 5,000 to about 100,000.

A suitable example of scale-inhibiting copolymers include, but are not limited to a tetrapolymer of 4-sulfophenol methallyl ether, sodium methallyl sulfonate, acrylic acid and methyl methacrylate. The monomer unit, sulfophenol methallyl ether, has a formula (I):

$$CH_2{=}C(CH_3)CH_2OC_6H_4SO_3M \qquad (I)$$

where M represents hydrogen, alkali metal, alkaline earth metal or ammonium ions.

Other suitable examples of scale-inhibiting copolymers include, but are not limited to, a copolymer of acrylic acid and 4-sulfophenol methallyl ether; a copolymer of acrylic acid and 2-acrylamido-2-methylpropane sulfonate; a terpolymer of acrylic acid, 2-acrylamido-2-methylpropane sulfonate and sodium styrene sulfonate; a copolymer of acrylic acid and vinyl pyrrolidone; and a copolymer of acrylic acid and acrylamide. Preferably, the polymer is the tetrapolymer of 4-sulfophenol methallyl ether, sodium methallyl sulfonate, acrylic acid and methyl methacrylate.

The copolymer incorporated in the compositions of the invention are present in an effective amount, preferably from about 0.01% to about 20% by wt., more preferably from about 0.075 to about 20% by wt., most preferably from about 0.15% to about 15% by wt. These correspond to a copolymer level of about 0.1 ppm to about 120 ppm, preferably from about 0.5 ppm to about 115 ppm, most preferably from about 1 ppm to about 100 ppm in the rinse liquor if the rinse aid is used at a normal dosage level of 3 ml/5 liter rinse water.

Another objective of the invention is to provide a process for warewashing in a dishwashing machine whereby in the rinse step there is added to the rinse water a scale inhibiting polymer defined within the scope of this invention in an amount such that the rinse liquor contains the defined polymers in a concentration of from about 0.1 ppm to about 120 ppm, preferably, from about 1ppm to about 100 ppm.

Preferred commercial available copolymers include: Alcosperse 240, Aquatreat AR 540 and Aquatreat MPS supplied by Alco Chemical; Acumer 3100 and Acumer 2000 supplied by Rohm & Haas; Goodrich K-798, K-775 and K-797 supplied by BF Goodrich; ACP 1042 supplied by ISP technologies Inc.; and polyacrylic acid/acrylamide supplied by Aldrich. A particularly preferred copolymer is Alcosperse 240 supplied by Alco Chemical.

pH of the Compositions

In a highly preferred aspect of the invention, the compositions have a pH as a 1% solution in distilled water at 20° C. of less than 7, preferably from about 0.5 to about 6.5, most preferably from about 1.0 to about 5.0.

The pH of the compositions may be adjusted by the use of various pH adjusting agents. Preferred acidification agents include inorganic and organic acids including, for example, carboxylic acids, such as citric and succinic acids, polycarboxylic acids, such as polyacrylic acid, and also acetic acid, boric acid, malonic acid, adipic acid, fumaric acid, lactic acid, glycolic acid, tartaric acid, tartronic acid, maloic acid, their derivatives and any mixtures of the foregoing. Most preferred acidification acid is citric acid which has the advantage of providing builder capacity to the rinse solution.

Surfactant System

A surfactant system comprising a surfactant selected from nonionic, anionic, cationic, ampholytic and zwitterionic surfactants and mixtures thereof is preferably present in the composition.

The surfactant system most preferably comprises low foaming nonionic surfactant, selected for its wetting ability, preferably selected from ethoxylated and/or propoxylated nonionic surfactants, more preferably selected from nonionic ethoxylated/propoxylated fatty alcohol surfactants.

The surfactant system is typically present at a level of from about 1% to about 40% by weight, more preferably about 1.5% to about 30% by weight, most preferably from about 5% to about 20% by weight of the compositions.

Anionic Surfactant

Essentially any anionic surfactants useful for detersive purposes can be included in the compositions. These can include salts (including, for example, sodium, potassium, ammonium, and substituted ammonium salts such as mono-, di- and triethanolamine salts) of the anionic sulfate, sulfonate, carboxylate and sarcosinate surfactants.

Other anionic surfactants include the isethionates such as the acyl isethionates, N-acyl taurates, fatty acid amides of methyl tauride, alkyl succinates and sulfosuccinates, monoesters of sulfosuccinate (especially saturated and unsaturated $C_{12}$–$C_{18}$ monoesters), diesters of sulfosuccinate (especially saturated and unsaturated $C_6$–$C_{14}$ diesters), N-acyl sarcosinates. Resin acids and hydrogenated resin acids are also suitable, such as rosin, hydrogenated rosin, and resin acids and hydrogenated resin acids present in or derived from tallow oil.

Anionic Sulfate Surfactant

Anionic sulfate surfactants suitable for use herein include the linear and branched primary alkyl sulfates, alkyl ethoxysulfates, fatty oleyl glycerol sulfates, alkyl phenol ethylene oxide ether sulfates, the $C_5$–$C_{17}$ acyl N-($C_1$–$C_4$ alkyl) and —N-($C_1$–$C_2$ hydroxyalkyl) glucamine sulfates, and sulfates of alkylpolysaccharides such as the sulfates of alkylpolyglucoside (the nonionic nonsulfated compounds being described herein).

Alkyl ethoxysulfate surfactants are preferably selected from the group consisting of the $C_6$–$C_{18}$ alkyl sulfates which have been ethoxylated with from about 0.5 to about 20 moles of ethylene oxide per molecule. More preferably, the alkyl ethoxysulfate surfactant is a $C_6$–$C_{18}$ alkyl sulfate which has been ethoxylated with from about 0.5 to about 20, preferably from about 0.5 to about 5, moles of ethylene oxide per molecule.

Anionic Sulfonate Surfactant

Anionic sulfonate surfactants suitable for use herein include the salts of $C_5$–$C_{20}$ linear alkylbenzene sulfonates, alkyl ester sulfonates, $C_6$–$C_{22}$ primary or secondary alkane sulfonates, $C_6$–$C_{24}$ olefin sulfonates, sulfonated polycarboxylic acids, alkyl glycerol sulfonates, fatty acyl glycerol sulfonates, fatty oleyl glycerol sulfonates, and any mixtures thereof.

Anionic Carboxylate Surfactant

Anionic carboxylate surfactants suitable for use herein include the alkyl ethoxy carboxylates, the alkyl polyethoxy polycarboxylate surfactants and the soaps ('alkyl carboxyls'), especially certain secondary soaps as described herein.

Preferred alkyl ethoxy carboxylates for use herein include those with the formula $$RO(CH_2CH_2O)_xCH_2COO^-M^+$$

wherein R is a $C_6$ to $C_{18}$ alkyl group, x ranges from 0 to 10, and the ethoxylate distribution is such that, on a weight basis, the amount of material where x is 0 is less than about 20%, and the amount of material where x is greater than 7, is less than about 25%, the average x is from about 2 to 4 when the average R is $C_{13}$ or less, and the average x is from about 3 to 10 when the average R is greater than $C_{13}$, and M is a cation, preferably chosen from alkali metal, alkaline earth metal, ammonium, mono-, di-, and triethanol-ammonium, most preferably from sodium, potassium, ammonium and mixtures thereof with magnesium ions. The preferred alkyl ethoxy carboxylates are those where R is a $C_{12}$ to $C_{18}$ alkyl group.

Alkyl polyethoxy polycarboxylate surfactants suitable for use herein include those having the formula RO—(CHR$_1$—CHR$_2$—O)$_x$—R$_3$ wherein R is a $C_6$ to $C_{18}$ alkyl group, x is from 1 to 25, $R_1$ and $R_2$ are selected from the group consisting of hydrogen, methyl acid radical, succinic acid radical, hydroxysuccinic acid radical, and mixtures thereof, wherein at least one $R_1$ or $R_2$ is a succinic acid radical or hydroxysuccinic acid radical, and $R_3$ is selected from the group consisting of hydrogen, substituted or unsubstituted hydrocarbon having between 1 and 8 carbon atoms, and mixtures thereof.

Preferred soap surfactants are secondary soap surfactants which contain a carboxyl unit connected to a secondary carbon. The secondary carbon can be in a ring structure, e.g. as in p-octyl benzoic acid, or as in alkyl-substituted cyclohexyl carboxylates. The secondary soap surfactants should preferably contain no ether linkages, no ester linkages and no hydroxyl groups. There should preferably be no nitrogen atoms in the head-group (amphiphilic portion). The secondary soap surfactants usually contain 11–13 total carbon atoms, although slightly more (e.g., up to 16) can be tolerated, e.g. p-octyl benzoic acid.

The following general structures further illustrate some of the preferred secondary soap surfactants:

A. A highly preferred class of secondary soaps comprises the secondary carboxyl materials of the formula:

$$R^3CH(R^4)COOM,$$

wherein $R^3$ is $CH_3(CH_2)_x$ and $R^4$ is $CH_3(CH_2)_y$, wherein y can be 0 or an integer from 1 to 4, x is an integer from 4 to 10 and the sum of (x+y) is 6–10, preferably 7–9, most preferably 8.

B. Another preferred class of secondary soaps comprises those carboxyl compounds wherein the carboxyl substituent is on a ring hydrocarbyl unit, i.e., secondary soaps of the formula:

$$R^5—R^6—COOM,$$

wherein $R^5$ is $C_7$–$C_{10}$, preferably $C_8$–$C_9$, alkyl or alkenyl and $R^6$ is a ring structure, such as benzene, cyclopentane and cyclohexane. (Note: $R^5$ can be in the ortho, meta or para position relative to the carboxyl on the ring.)

C. Still another preferred class of secondary soaps comprises secondary carboxyl compounds of the formula:

$$CH_3(CHR)_k—(CH_2)_m—(CHR)_n—CH(COOM)(CHR)_o—(CH_2)_p(CHR)_q—CH_3,$$

wherein each R is $C_1$–$C_4$ alkyl, wherein k, m, n, o, q are integers in the range of 0–8, provided that the total number of carbon atoms (including the carboxylate) is in the range of 10 to 18.

In each of the above formulas A, B and C, the species M can be any suitable, especially water solubilizing, counterion.

Especially preferred secondary soap surfactants for use herein are water-soluble members selected from the group consisting of the water-soluble salts of 2-methyl-1-undecanoic acid, 2-ethyl-1-decanoic acid, 2-propyl-1-nonanoic acid, 2-butyl-1-octanoic acid and 2-pentyl-1-heptanoic acid.

Alkali Metal Sarcosinate Surfactant

Other suitable anionic surfactants are the alkali metal sarcosinates of formula:

$R—C(O)N(R^1)CH_2COOM$, wherein R is a $C_5$–$C_{17}$ linear or branched alkyl or alkenyl group, $R^1$ is a $C_1$–$C_4$ alkyl group and M is an alkali metal ion. Preferred examples are the myristyl and oleyl methyl sarcosinates in the form of their sodium salts.

Nonionic Surfactant

Essentially any nonionic surfactants useful for detersive purposes can be includes in the compositions. Exemplary, non-limiting classes of useful nonionic surfactant are listed below.

Nonionic Polyhydroxy Fatty Acid Amide Surfactant

Polyhydroxy fatty acid amides suitable for use herein are those having the structural formula:

$R^2CONR^1Z$ wherein $R^1$ is H, $C_1$–$C_4$ hydrocarbyl, 2-hydroxy ethyl, 2-hydroxy propyl, or a mixture thereof, preferable $C_1$–$C_4$ alkyl, more preferably $C_1$ or $C_2$ alkyl, most preferably $C_1$ alkyl (i.e., methyl); and $R^2$ is a $C_5$–$C_{31}$ hydrocarbyl, preferably straight-chain $C_5$–$C_{19}$ alkyl or alkenyl, more preferably straight-chain $C_9$–$C_{17}$ alkyl or alkenyl, most preferably straight-chain $C_{11}$–$C_{17}$ alkyl or alkenyl, or mixture thereof; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z preferably will be derived from a reducing sugar in a reductive amination reaction; more preferably Z is a glycityl.

Nonionic Condensates of Alkyl Phenols

The polyethylene, polypropylene, and polybutylene oxide condensates of alkyl phenols are suitable for use herein. In general, the polyethylene oxide condensates are preferred. These compounds include the condensation products of alkyl phenols having an alkyl group containing from about 6 to about 18 carbon atoms in either a straight chain or branched chain configuration with the alkylene oxide.

Nonionic Ethoxylated Alcohol Surfactant

The alkyl ethoxylate condensation products of aliphatic alcohols with from about 1 to about 25 moles of ethylene oxide are suitable for use herein. The alkyl chain of the aliphatic alcohol can either be straight or branched, primary or secondary, and generally contains from 6 to 22 carbon atoms. Particularly preferred are the condensation products of alcohols having an alkyl group containing from 8 to 20 carbon atoms with from about 2 to about 10 moles of ethylene oxide per mole of alcohol.

Nonionic Ethoxylated/Propoxylated Fatty Alcohol Surfactant

The ethoxylated $C_6$–$C_{18}$ fatty alcohols and $C_6$–$C_{18}$ mixed ethoxylated/propoxylated fatty alcohols are highly preferred surfactants for use herein, particularly where water soluble. Preferably the ethoxylated fatty alcohols are the $C_{10}$–$C_{18}$ ethoxylated fatty alcohols with a degree of ethoxylation of from 3 to 50, most preferably these are the $C_{12}$–$C_{18}$ ethoxylated fatty alcohols with a degree of ethoxylation from 3 to 40. Preferably the mixed ethoxylated/propoxylated fatty alcohols have an alkyl chain length of from 10 to 18 carbon atoms, a degree of ethoxylation of from 3 to 30 and a degree of propoxylation of from 1 to 10.

Nonionic EO/PO Condensates with Propylene Glycol

The condensation products of ethylene oxide with a hydrophobic base formed by the condensation of propylene oxide with propylene glycol are suitable for use herein. The hydrophobic portion of these compounds preferably has a molecular weight of from about 1500 to about 1800 and exhibits water insolubility. Examples of compounds of this type include certain of the commercially-available 'Pluronic' surfactants, marketed by BASF.

Nonionic EO Condensation Products with Propylene Oxide/Ethylene Diamine Adducts

The condensation products of ethylene oxide with the product resulting from the reaction of propylene oxide and ethylenediamine are suitable for use herein. The hydrophobic moiety of these products consists of the reaction product of ethylenediamine and excess propylene oxide, and generally has a molecular weight of from about 2500 to about 3000. Examples of this type of nonionic surfactant include certain of the commercially available Tetronic™ compounds, marketed by BASF.

Nonionic Fatty Acid Amide Surfactant

Fatty acid amide surfactants suitable for use herein are those having the formula $R^6(C{=}O)N(R^7)_2$ wherein $R^6$ is an alkyl group containing from 7 to 21, preferably from 9 to 17 carbon atoms and each $R^7$ is selected from the group consisting of hydrogen, $C_1$–$C_4$ alkyl, $C_1$–$C_4$ hydroxyalkyl, and $—(C_2H_4O)_xH$, where x is in the range of from 1 to 3.

Amphoteric Surfactant

Suitable amphoteric surfactants for use herein include the amine oxide surfactants and the alkyl amphocarboxylic acids.

A suitable example of an alkyl amphodicarboxylic acid for use herein is Miranol(TM) C2M Conc. manufactured by Miranol, Inc., Dayton, N.J.

Amine Oxide Surfactant

Amine oxides useful in the present invention include those compounds having the formula:

$R^3(OR^4)_xNO(R^5)_2$ wherein $R^3$ is selected from an alkyl, hydroxyalkyl, acylamidopropoyl and alkyl phenyl group, or mixtures thereof, containing from 8 to 26 carbon atoms, preferably 8 to 18 carbon atoms; $R^4$ is an alkylene or hydroxyalkylene group containing from 2 to 3 carbon atoms, preferably 2 carbon atoms, or mixtures thereof; x is from 0 to 5, preferably from 0 to 3; and each $R^5$ is an alkyl or hydyroxyalkyl group containing from 1 to 3, preferably from 1 to 2 carbon atoms, or a polyethylene oxide group containing from 1 to 3, preferable 1, ethylene oxide groups. The $R^5$ groups can be attached to each other, e.g., through an oxygen or nitrogen atom, to form a ring structure.

These amine oxide surfactants in particular include $C_{10}$–$C_{18}$ alkyl dimethyl amine oxides and $C_8$–$C_{18}$ alkoxy ethyl dihydroxyethyl amine oxides. Examples of such materials include dimethyloctylamine oxide, diethyldecylamine oxide, bis-(2-hydroxyethyl)dodecylamine oxide, dimethyldodecylamine oxide, dipropyltetradecylamine oxide, methylethylhexadecylamine oxide, dodecylamidopropyl dimethylamine oxide, cetyl dimethylamine oxide, stearyl dimethylamine oxide, tallow dimethylamine oxide and dimethyl-2-hydroxyoctadecylamine oxide. Preferred are $C_{10}$–$C_{18}$ alkyl dimethylamine oxide, and $C_{10}$–$C_{18}$ acylamido alkyl dimethylamine oxide.

Zwitterionic Surfactant

Zwitterionic surfactants can also be incorporated into the compositions hereof. These surfactants can be broadly described as derivatives of secondary and tertiary amines, derivatives of heterocyclic secondary and tertiary amines, or derivatives of quaternary ammonium, quaternary phosphonium or tertiary sulfonium compounds. Betaine and sultaine surfactants are exemplary zwitterionic surfactants for use herein.

Betaine Surfactant

The betaines useful herein are those compounds having the formula $R(R^1)_2N^+R^2COO^-$ wherein R is a $C_6$–$C_{18}$ hydrocarbyl group, preferably a $C_{10}$–$C_{16}$ alkyl group or $C_{10-16}$ acylamido alkyl group, each $R^1$ is typically $C_1$–$C_3$ alkyl, preferably methyl, and $R^2$ is a $C_1$–$C_5$ hydrocarbyl group, preferably a $C_1$–$C_3$ alkylene group, more preferably a $C_1$–$C_2$ alkylene group. Examples of suitable betaines include coconut cylamidopropyidimethyl betaine; hexadecyl dimethyl betaine; $C_{12-14}$ acylamidopropylbetaine; $C_{8-14}$ acylamidohexyidiethyl betaine; 4[$C_{14-16}$ acylmethylamidodiethylammonio]-1-carboxybutane; $C_{6-18}$ acylamidodimethylbetaine; $C_{12-16}$ acylamidopentanediethylbetaine; $C_{12-16}$ acylmethylamidodimethylbetaine. Preferred betaines are $C_{12-18}$ dimethyl-ammonio hexanoate and the $C_{10-18}$ acylamidopropane (or ethane) dimethyl (or diethyl) betaines. Complex betaine surfactants are also suitable for use herein.

Sultaine Surfactant

The sultaines useful herein are those compounds having the formula $(R(R^1)_2N^+R^2SO_3^-$ wherein R is a $C_6$–$C_{18}$ hydrocarbyl group, preferably a $C_{10}$–$C_{16}$ alkyl group, more preferably a $C_{12}$–$C_{13}$ alkyl group, each $R^1$ is typically $C_1$–$C_3$ alkyl, preferably methyl, and $R^2$ is a $C_1$–$C_6$ hydrocarbyl group, preferably a $C_1$–$C_3$ alkylene or, preferably, hydroxyalkylene group.

Ampholytic Surfactant

Ampholytic surfactants can be incorporated into the compositions herein. These surfactants can be broadly described as aliphatic derivatives of secondary or tertiary amines, or aliphatic derivatives of heterocyclic secondary and tertiary amines in which the aliphatic radical can be straight chain or branched.

Cationic Surfactants

Cationic surfactants can also be used in the compositions herein. Suitable cationic surfactants include the quaternary ammonium surfactants selected from mono $C_6$–$C_{16}$, preferably $C_6$–$C_{10}$ N-alkyl or alkenyl ammonium surfactants wherein the remaining N positions are substituted by methyl, hydroxyethyl or hydroxypropyl groups.

Of all of the above, the preferred surfactant systems are low foaming nonionic surfactant, selected for its wetting ability, preferably selected from ethoxylated and/or propoxylated nonionic surfactants, more preferably selected from nonionic ethoxylated/propoxylated fatty alcohol surfactants.

Builder System

A highly preferred component of the rinsing compositions of the present invention is a detergent builder system which is preferably present at a level of from 0% to about 60% by weight, more preferably from about 1% to about 30% by weight, most preferably from about 2% to about 20% weight of the composition.

The detergent builder system is preferably water-soluble, and can, for example, contain builder compounds selected from monomeric polycarboxylates and their acid forms or homo or copolymeric polycarboxylic acids and their salts in which the polycarboxylic acid comprises at least two carboxylic radicals separated from each other by not more than two carbon atoms.

Suitable water-soluble monomeric or oligomeric carboxylate builders can be selected from a wide range of compounds but such compounds preferably have a first carboxyl logarithmic acidity/constant ($pK_1$) of less than 9, preferably of between 2 and 8.5, more preferably of between 2.5 and 7.5.

The carboxylate or polycarboxylate builder can be monomeric or oligomeric in type although monomeric polycarboxylates are generally preferred for reasons of cost and performance. Monomeric and oligomeric builders can be selected from acyclic, alicyclic, heterocyclic and aromatic carboxylates.

Suitable carboxylates containing one carboxy group include the water soluble salts of lactic acid, glycolic acid and ether derivatives thereof. Polycarboxylates containing two carboxy groups include the water-soluble salts of succinic acid, malonic acid, (ethylenedioxy) diacetic acid, maleic acid, diglycolic acid, tartaric acid, tartronic acid and fumaric acid, as well as the ether carboxylates and the sulfinyl carboxylates. Polycarboxylates containing three carboxy groups include, in particular, water-soluble citrates, aconitrates and citraconates as well as succinate derivatives such as the carboxymethyloxysuccinates, lactoxysuccinates, and aminosuccinates, and the oxypolycarboxylate materials such as 2-oxa-1,1,3-propane tricarboxylates.

Polycarboxylates containing four carboxy groups include oxydisuccinates, 1,1,2,2-ethane tetracarboxylates, 1,1,3,3-propane tetracarboxylates and 1,1,2,3-propane tetracarboxylates. Polycarboxylates containing sulfo substituents include the sulfosuccinate derivatives, and the sulfonated pyrolysed citrates.

Alicyclic and heterocyclic polycarboxylates include cyclopentane-cis,cis,cis-tetracarboxylates, cyclopentadienide pentacarboxylates, 2,3,4,5-tetrahydroturan-cis, cis, cis-tetracarboxylates, 2,5-tetrahydrofuran-cis-dicarboxylates, 2,2,5,5-tetrahydrofuran-tetracarboxylates, 1,2,3,4,5,6-hexane-hexacarboxylates and carboxymethyl derivatives of polyhydric alcohols such as sorbitol, mannitol and xylitol. Aromatic polycarboxylates include mellitic acid, pyromellitic acid and the phthalic acid derivatives disclosed in British Patent No. 1,425,343.

Of the above, the preferred polycarboxylates are hydroxy-carboxylates containing up to three carboxy groups per molecules, more particularly citrates or citric acid.

The parent acids of the monomeric or oligomeric polycarboxylate chelating agents or mixtures thereof with their salts, e.g. citric acid or citrate/citric acid mixtures are also contemplated as components of builder systems of rinse compositions in accordance with the present invention.

The carboxylate or polycarboxylate builder compounds described above can also have a dual function as pH controlling agents.

Optional Builders

It is known in the art that selected builders described in this optional builder section will, if present at underbuilt levels in the rinse water, exacerbate any scaling problems and therefore, for this reason, are less desirable as builders than the materials described above.

Not withstanding the foregoing, the alkali metal, ammonium and alkanolammonium salts of polyphosphates (exemplified by the tripolyphosphates, pyrophosphates, and glassy polymeric meta-phosphates) may be used as optional components of builder systems of rinse compositions in accordance with the present invention. Specific examples of phosphate builders are the alkali metal tripolyphosphates, sodium, potassium and ammonium pyrophosphate, sodium and potassium orthophosphate, sodium polymeta/phosphate in which the degree of polymerisation ranges from about 6 to 21, and salts of phytic acid.

Other water-soluble detergent builders include, but are not limited to, silicates, carbonates (including bicarbonates and sesquicarbonates), sulfates, borate builders, as well as builders containing borate-forming materials that can produce borate under detergent storage or wash conditions can also be used.

Suitable silicates include the water soluble sodium silicates with an $SiO_2$:$Na_2O$ ratio of from 1.0 to 2.8, with ratios of from 1.6 to 2.4 being preferred, and 2.0 ratio being most preferred. The silicates may be in the form of either the anhydrous salt or a hydrated salt.

The compositions of the invention may also include less water soluble builders although preferably their levels of incorporation are minimized. Examples of such less water soluble builders include the crystalline layered silicates, and the largely water insoluble sodium aluminosilicates.

Heavy Metal Ion Sequestrants

The rinsing compositions herein may also optionally contain transition metal chelating agents (sequestrants). These chelating agents may also have calcium and magnesium chelation capacity, but preferentially they bind heavy metal ions such as iron, manganese and copper.

Heavy metal ion sequestrants are preferably present at a level of from 0.005% to 20%, more preferably from 0.1% to 10%, most preferably from 0.2% to 5% by weight of the composition.

Heavy metal ion sequestrants, which are acidic in nature, having for example carboxylic acid or phosphonic acid functionalities, may be present either in their acid form or as a complex/salt with a suitable counter cation such as an alkali or alkaline metal ion, ammonium, or substituted ammonium ion, or any mixtures thereof. Preferably any salts/complexes are water soluble. The molar ratio of said-counter cation to the heavy metal ion sequestrant is preferably at least 1:1.

Organo aminophosphonic acids are preferred additional heavy metal ion sequestrant components herein. By organo aminophosphonic acid it is meant herein an organic compound comprising at least one phosphonic acid group, and at least one amino group.

Suitable organo aminophosphonic acid components for use herein include the amino alkylene poly (alkylene phosphonic acids) and nitrilo trimethylene phosphonic acids.

Preferred are diethylene triamine penta (methylene phosphonic acid) and hexamethylene diamine tetra (methylene phosphonic acid).

Other suitable additional heavy metal ion sequestrants for use herein include nitrilotriacetic acid and polyaminocarboxylic acids such as ethylenediaminotetracetic acid, or ethylenetriamine pentacetic acid.

Still other suitable additional heavy metal ion sequestrants for use herein are iminodiacetic acid derivatives such as 2-hydroxyethyl diacetic acid or glyceryl imino diacetic acid.

Lime Soap Dispersant Compound

The compositions of the invention may contain a lime soap dispersant compound, which has a lime soap dispersing power (LSDP), as defined hereinafter, of no more than 8, preferably no more than 7, most preferably no more than 6. The lime soap dispersant compound is preferably present at a level of from 0.1% to 40% by weight, more preferably 1% to 20% by weight, most preferably from 2% to 10% by weight of the compositions.

A lime soap dispersant is a material that prevents the precipitation of alkali metal, ammonium or amine salts of fatty acids by calcium or magnesium ions. A numerical measure of the effectiveness of a lime soap dispersant is given by the lime soap dispersing power (LSDP) which is determined using the lime soap dispersion test as described in an article by H. C. Borghetty and C. A. Bergman, J. Am. Oil. Chem. Soc., volume 27, pages 88–90, (1950). This lime soap dispersion test method is widely used by practitioners in this art field being referred to, for example, in the following review articles; W. N. Linfield, Surfactant Science Series, Volume 7, p3; W. N. Linfield, Tenside Surf. Det., Volume 27, pages 159–161, (1990); and M. K. Nagarajan, W. F. Maslar, Cosmetics and Toiletries, Volume 104, pages 71–73, (1989). The LSDP is the % weight ratio of dispersing agent to sodium oleate required to disperse the lime soap deposits formed by 0.025 g of sodium oleate in 30 ml of water of 333 ppm $CaCO_3$ (Ca:Mg=3:2) equivalent hardness.

Surfactants having good lime soap dispersant capability will include certain amine oxides, betaines, sulfobetaines, alkyl ethoxysulfates and ethoxylated alcohols.

Exemplary surfactants having a LSDP of no more than 8 for use in accord with the invention include $C_{16}$–$C_{18}$ dimethyl amine oxide, $C_{12}$–$C_{18}$ alkyl ethoxysulfates with an average degree of ethoxylation of from 1–5, particularly $C_{12}$–$C_{15}$ alkyl ethoxysulfate surfactant with a degree of ethoxylation of about 3 (LSDP=4) and the $C_{13}$–$C_{15}$ ethoxylated alcohols with an average degree of ethoxylation of either 12 (LSDP=6) or 30, sold under the trade names Lutensol A012 and Lutensol A030 respectively, by BASF GmbH.

Solvent

The compositions of the invention may contain organic solvents, particularly when formulated as liquids or gels. The compositions in accord with the invention preferably contain a solvent system present at levels of from about 1% to about 30% by weight, preferably from about 3% to 25% by weight, more preferably form about 5% to about 20% by weight of the composition. The solvent system may be a mono or mixed solvent system. Preferably, at least the major component of the solvent system is of low volatility.

Suitable organic solvent for use herein has the general formula $RO(CH_2C(Me)HO)_nH$, wherein R is an alkyl, alkenyl, or alkyl aryl group having from 1 to 8 carbon atoms, and n is an integer from 1 to 4. Preferably, R is an alkyl group containing 1 to 4 carbon atoms, and n is 1 or 2. Especially preferred R groups are n-butyl or isobutyl. Preferred solvents of this type are 1-n-butoxypropane-2-ol (n=1): and 1(2-n-butoxy-1-methylethoxy)propane-2-ol (n=2), and mixtures thereof.

Other solvents useful herein include the water soluble CARBITOL® solvents or water-soluble CELLOSOLVE® solvents. Water-soluble CARBITOL® solvents are compounds of the 2-(2 alkoxyethoxy)ethanol class wherein the alkoxy group is derived from ethyl, propyl or butyl; a preferred water-soluble carbitol is 2(2-butoxyethoxy) ethanol also known as butyl carbitol. Water-soluble CELLOSOLVE® solvents are compounds of the 2-alkoxyethoxy ethanol class, with 2-butoxyethoxyethanol being preferred.

Other suitable solvents are benzyl alcohol, and diols such as 2-ethyl-1,3-hexanediol and 2,2,4-trimethyl-1,3-pentanediol.

The low molecular weight, water-soluble, liquid polyethylene glycols are also suitable solvents for use herein.

The alkane mono and diols, especially the $C_1$–$C_6$ alkane mono and diols are suitable for use herein. $C_1$–$C_4$ monohydric alcohols (eg: ethanol, propanol, isopropanol, butanol and mixtures thereof) are preferred, with ethanol particularly preferred. The $C_1$–$C_4$ dihydric alcohols, including propylene glycol, are also preferred.

Hydrotropes

A highly preferred component of the compositions of the invention is a hydrotrope. The hydrotrope is typically present at levels of from about 0.5% to about 20%, preferably from about 1% to about 10%, by weight.

Useful hydrotropes include sodium, potassium, and ammonium xylene sulfonates, sodium, potassium, and ammonium toluene sulfonate, sodium, potassium and ammonium cumene sulfonate, and mixtures thereof.

Machine Dishwashing Method

The rinse aid compositions in accordance with the present invention may be used in essentially any conventional machine dishwashing method performed using a dishwasher machine, which may be selected from any of those commonly available on the market.

The machine dishwashing method typically comprises treating soiled articles, such as crockery, glassware, hollowware and cutlery, with an aqueous liquid having dissolved or dispersed therein an effective amount of detergent composition. By an effective amount of detergent composition it is generally meant from 8 g to 60 g of detergent composition per wash, dissolved or dispersed in a wash solution volume of from 3 to 10 liters, which are typical product dosages employed in conventional machine dishwashing methods. The wash temperature may be in the range 40° C. to 65° C. as commonly is employed in such processes. The rinse aid composition is typically employed at levels of from 0.5 g to 6 g of rinse aid composition per rinse cycle.

The following examples will serve to distinguish this invention from the prior art and illustrate its embodiment more fully. Unless otherwise indicated, all parts, percentages and portions referred to are by weights.

EXAMPLE 1

In this example, the calcium phosphate scale inhibition of each polymer was determined using the procedure described below.

STP and calcium chloride stock solutions were seperately prepared in a pH 10.0 borax buffer. STP hexahydrate of over 99.5% purity as verified by $^{31}P$ NMR was supplied by FMC, Princeton, N.J.

50 ml 1 mM STP and 50 ml 10 mM calcium chloride solutions were prepared from the stock solutions via dilution with the pH 10 buffer. A stock polymer solution to be tested was added into either the STP solution or the $Ca^{2+}$ solution to give a final concentration of 100 ppm polymer once the STP and $Ca^{2+}$ solutions were mixed. In a control reaction, the polymer solution was not added.

50 ml 1 mM STP and 50 ml 10 mM calcium chloride solutions were preheated in a water bath thermostated at 55° C. and equipped with a submerged stirrer.

STP solution was added quickly into the calcium chloride solution while stirring.

After 10 min. of mixing, the solution was filtered through a 0.45 micron filter under vacuum. The filtered solution was then analyzed for tripolyphosphate concentration. Three milliliters of the filtered solution was added into a 50 ml flask, followed by the addition of 25 ml 4N $H_2SO_4$, and then D.I water was added to the mark. The flask was then immersed in boiling water for one hour to completely hydrolyze tripolyphosphate to orthophosphate. Finally, the resultant orthophosphate concentration was determined using a molybdenum blue method, following the standard procedure described in Vogel's text book of Qualitative Inorganic Analysis (J. Bassett, et al, 1978), except that the color reagent, sodium molybdate, was prepared in de-ionized water rather than in $H_2SO_4$ solution. A standard curve was created using known concentrations of STP solutions.

The results were reported as percent inhibition calculated by the following formula:

$$\%\ \text{inhibition} = \frac{[P_3O_{10}^{5-}]_{treated} - [P_3O_{10}^{5-}]_{control}}{[P_3O_{10}^{5-}]_{initial} - [P_3O_{10}^{5-}]_{control}} \times 100\%$$

wherein $[P_3O_{10}{}^{5-}]_{treated}$ means a concentration of phosphate ion in the filtrate in the presence of the inhibitor; $[P_3O_{10}{}^{5-}]_{control}$ mean a concentration of phosphate ion in the filtrate in the absence of inhibitor and $[P_3O_{10}{}^{5-}]_{initial}$ means a concentration of phosphate ion before precipitation reaction.

EXAMPLE 2

The results of scale inhibitor polymers within the scope of the invention and of a variety of other commercial scale inhibitors for comparison are given in Table 1.

TABLE 1

| Polymer | Source | % Inhibition |
|---|---|---|
| 1)PAA/MMA/SPME/SMS | Alcosperse 240 supplied by Alco Chemical | 100% |
| 2)PAA/Acryloamide (200,000, MW) | Supplied by Aldrich | 100% |
| 3)PAA/N-Vinyl pyrrolidone | ACP 1042 supplied by ISP Technologies, Inc | 100% |
| 4)PAA/N-Vinyl pyrrolidone | Acrylidone 1001 supplied by ISP | 68% |
| 5)PAA/SPME | Aquatreat MPS supplied by Alco chemical | 96% |
| 6)PAA/SPME | Aquatreat AR 540 supplied by Alco chemical | 94% |
| 7)PAA/AMPS | Acumer 3100 supplied by Rohm & Haas | 94% |
| 8)PAA/AMPS | Acumer 2000 supplied by Rohm & Haas | 92% |
| 9)PAA/AMPS/SSS | K-798 supplied by BF Goodrich | 95% |
| 10)PAA/AMPS | K-775 supplied by BF Goodrich | 94% |
| 11)PAA/AMPS/SSS | K-797 supplied by BF Goodrich | 100% |
| 12)Polyacrylic acid | Colloid 106 supplied by Rhone-Poulene Inc. | 0% |
| 13)Polyacrylic acid (2,100 MW) | Supplied by Aldrich | |
| 14)Polyacrylic acid/ methacrylic acid | Colloid 226/35 supplied by Rhone-Poulene Inc. | 0% |
| 15)Polyacrylate | BSI 82 supplied by Buckman Lab | 0% |
| 16)Sodium acrylate silicate ester | SASE supplied by Buckman Lab | 0% |
| 17)PAA/Phosphonate | Casi 773 supplied by Buckman Lab | 0% |
| 18)Polymaleic acid | Belclene 200 supplied by FMC | 0% |
| 19)PAA/maleic acid (50,000 MW) | Supplied by Aldrich | 0% |
| 20)Polymaleic anhydride/ styrene | Supplied by Aldrich | 0% |
| 21)PAA/Maleic acid/ vinyl acetate | Supplied by Huls | 0% |
| 22)ATMP | Dequest 2006 supplied by Monsanto | 0% |
| 23)HEDP | Dequest 2010 supplied by Monsanto | 0% |
| 24)Polyaspartic acid MW = 1,500–3000 | Sokaian ES 9959 supplied by BASF | 0% |
| 25)Sodium polyaspartate MW = 18,000 | QRXP-1448 supplied by Rohm & Haas | 0% |

TABLE 1-continued

| Polymer | Source | % Inhibition |
|---|---|---|
| 26)PAA/Sucrose/SMS (50:33:17, wt. %) | Prepared according to WO 9401476 | 0% |

Symbols given above represent the following:
PAA: polyacrylic acid
MMA: Methyl methacrylate
SPME: Sulfophenol methallyl ether
SMS: Sodium methallyl sulfonate
AMPS: 2-acrylamido-2-methylpropane sulfonic acid
SSS: Sodium styrene sulfonate
ATMP: Amino tri (methylene phosphonic acid)
HEDP: 1-hydroxyethylene, (1,1-diphosphonic acid)

As this example demonstrates, polymers 1–11 which lie within the scope of the invention are effective antiscalants in comparison to polymers 12–26 which are outside the scope of the invention. It is especially noteworthy that, the terpolymer, polyacrylic acid/maleic acid/vinyl acetate (#21), claimed in DE4415804; the organo diphosphonic acid (#23), claimed in EP 659873 and the polyamino compound, polyaspartic acid and its sodium salt (#24 and #25), claimed in EP 561464 are not effective for inhibition of calcium tripolyphosphate precipitation under highly underbuilt conditions. Particularly, the terpolymer of acrylic acid, sucrose and 2-methallyl sulfonate (#26) claimed in WO 95/32271, which falls outside the scope of the present invention was observed to be an ineffective antiscalant.

EXAMPLE 3

Samples of the polymers which were found to be effective in Example 2 were further formulated into compositions and tested in a dishwasher to determine their effectiveness in preventing the formation of glass filming when incorporated into a rinse composition.

Machine dishwashing experiments were carried out under the following conditions using a Bosch model 6082 dishwasher: 55° C.; Economy cycle, 400 ppm water hardness as $CaCO_3$. Ten clean glass tumblers were uses as wash articles and loaded into the top rack of the dishwasher.

For the main wash cycle, a STP-built tablet composition commercially available in Europe was used. The composition is shown in Table 2 below.

TABLE 2

| Ingredient | % Weight |
|---|---|
| STP | 55.0 |
| Sodium disilicate (80%) | 27.6 |
| Perborate monohydrate | 9.0 |
| TAED (83%)* | 2.4 |
| Protease | 3.0 |
| Amylase | 1.8 |
| Nonionic surfactant | 1.0 |
| Perfume | 0.15 |
| BTA* | 0.05 |

*TAED = N,N,N',N'-tetraacetylethylene diamine.
BTA = Benzotriazole

At the start of the final rinse cycle, 3 g of a liquid rinse aid composition as shown in Table 3 were added:

TABLE 3

| Ingredient | % by wt. |
|---|---|
| Nonionic surfactant | 14.5% |
| Citric acid | 5% |
| Sodium xylene sulfonate | 5% |
| water | balance |

Comparative tests were carried out with the rinse aid composition (Sample 1 described in Table 3) and with the compositions containing a polymer at a level of 6.6% (as solid), which corresponds to a level of 40 ppm in the rinse water.

At the end of the whole wash cycle, the drinking glasses were visually graded by an expert panel for filming. Grade scales of from 0 to 5 were used to measure filming depositions, where a grade of 0 indicates no visible filming, a grade of 1 indicates a trace filming, a grade of 2 indicates a slight filming, a grade of 3 indicates a moderate filming, a grade of 4 indicates a heavy filming and a grade of 5 indicates coverage with a very heavy, opaque filming. The following filming scores were obtained:

| Samples | Trade name | Glass filming |
|---|---|---|
| 1) Control - no polymer | | 2.5 |
| 2) PAA/MMA/SPME/SME | Alcosperse 240 | 0.8 |
| 3) PAA/SPME | Aquatreat AR 540 | 1.0 |
| 4) PAA/SPME | Aquatreat MPS | 1.5 |
| 5) PAA/AMPS | Acumer 3100 | 1.3 |
| 6) PAA/AMPS/SSS | Goodrich K-798 | 1.6 |

Symbols given above represent the following:
PAA: polyacrylic acid
MMA: Methyl methacrylate
SPME: Sulfophenol methallyl ether
SMS: Sodium methallyl sulfonate
AMPS: 2-acrylamido-2-methylpropane sulfonic acid
SSS: Sodium styrene sulfonate As this example demonstrates, addition of polymers within the scope of the invention to the rinse composition significantly reduces glass filming.

EXAMPLE 4

This example further demonstrates the effectiveness of one of the above polymers, Alcosperse 240, in improving glass appearance, when incorporated into a rinse composition used with two different commercially available STP-built tablet products, Tablet 1 and Tablet 2. The composition of Tablet 1 is shown in Table 2 of Example 3. The composition of Tablet 2 is shown in Table 4.

TABLE 4

| Ingredient | % Weight |
|---|---|
| STP | 48.0 |
| Sodium disilicate (80%) | 12 |
| Carbonate | 6. |
| Perborate monohydrate | 8.0 |
| TAED (83%)* | 2.5 |
| Protease | 4.5 |
| Amylase | 1.5 |

TABLE 4-continued

| Ingredient | % Weight |
|---|---|
| Nonionic surfactant | 2.0 |
| BTA* | 0.05 |

*TAED = N,N,N',N'-tetraacetylethylene diamine.
BTA = Benzotriazole

The same experimental conditions as in Example 3 were followed except that glasses were loaded at the bottom rack of the dishwasher (for the runs with Tablet 1) and that 10 consecutive runs were carried out in this example with Alcosperse 240 used at a level of 6.6% in the rinse aid composition. Identical tests with a rinse aid containing no polymer were conducted as controls. The following filming scores were obtained:

| | Glass Filming Score | | | |
|---|---|---|---|---|
| | Tablet 1 | | Tablet 2 | |
| Run # | +Alcosperse 240 | −Alcosperse 240 | +Alcosperse 240 | −Alcosperse 240 |
| 1 | 1.6 | 2.8 | 1.4 | 2.7 |
| 2 | 1.7 | 3.5 | 1.5 | 3.1 |
| 3 | 1.7 | 3.9 | 1.6 | 3.1 |
| 4 | 1.7 | 4.0 | 1.5 | 3.1 |
| 5 | 1.7 | 4.0 | 1.5 | 3.2 |
| 6 | 1.8 | 4.0 | 1.5 | 4.0 |
| 7 | 1.8 | 4.0 | 1.5 | 4.1 |
| 8 | 1.8 | 4.0 | 1.5 | 4.1 |
| 9 | 1.8 | 4.0 | 1.5 | 4.1 |
| 10 | 1.8 | 4.1 | 1.5 | 4.1 |

As demonstrated in this example, the scale growth via multiple washes is well controlled by addition of Alcosperse 240 to the rinse aid composition of the invention.

We claim:

1. A method of rinsing tableware in a machine dishwasher with a rinse aid composition useful for inhibiting scale comprising the steps of:

(a) preparing a rinse aid composition comprising (i) an effective amount of a polymer consisting of about 50 wt. % to about 99% by weight of an olefinically unsaturated carboxylic acid monomer and about 1 wt. % to about 50 wt. % of at least one monomer unit selected from the group consisting of copolymerizable sulfonated monomers, N-vinyl pyrrolidone, acrylamides and mixtures thereof, and (ii) water; and b) introducing the rinse aid composition into a rinse cycle of a machine dishwasher to inhibit scale formation.

2. A method according to claim 1 wherein the polymer has an average molecular weight in the range of from about 1500 to 250,000.

3. A method according to claim 1 wherein the olefinically unsaturated carboxylic acid monomer is selected from the group consisting of aliphatic, branched or cyclic monocarboxylic acids, aliphatic, branched or cyclic dicarboxylic acids, aliphatic, branched or cyclic polycarboxylic acids, alkali earth metal, alkaline earth metal or ammonium salts thereof, anhydrides thereof and mixtures thereof.

4. A method according to claim 3 wherein the aliphatic acids are monolefinic acrylic acids containing a substituent selected from the group consisting of hydrogen, halogen, hydroxyl, monvalent alkyl radicals, monovalent aryl radicals, monovalent aralkyl radicals, monovalent alkaryl radicals and monovalent cycloaliphatic radicals.

5. A method according to claim 1 wherein the sulfonated monomers contain compounds selected from the group consisting of allyl hydroxypropanyl sulfonate ether, allylsulfonic acid, methallylsulfonic acid, styrene sulfonic acid, vinyl toluene sulfonic acid, acrylamino alkane sulfonic acid, allyloxybenzene sulfonic acid, 2-alkylallyloxybenzene sulfonic acid, and the alkali earth metals thereof, alkaline earth metals thereof, ammonium salts thereof and mixtures thereof.

6. A method according to claim 1 wherein the monomeric unit is selected from the group consisting of acrylamide, $C_1$–$C_6$ alkyl substituted acrylamides, N-alkyl-substituted acrylamides, N-alkanol-substituted acrylamides and N-vinyl pyrrolidone.

7. A method according to claim 1 wherein the polymer is a tetra polymer of sodium methallyl sulfonate, acrylic acid and methyl methacrylate and 4-sulfophenol methallyl ether having a formula:

$$CH_2{=}C(CH_3)CH_2OC_6H_4SO_3M$$

where M represents hydrogen, alkali metal, alkaline earth metal or ammonium ions.

8. A method according to claim 1 wherein the polymer is a copolymer selected from the group consisting of a copolymer of acrylic acid and 4-sulfophenol methallyl ether, a copolymer of acrylic acid and 2-acrylamido-2-methylpropane sulfonate, a terpolymer of acrylic acid, 2-acrylamido-2-methylpropane sulfonate, and sodium styrene sulfonate, a copolymer of acrylic acid and N-vinyl pyrrolidone, a copolymer or acrylic acid and acrylamide, and mixtures thereof.

9. A method according to claim 1 wherein the composition further comprises from about 1 wt. % to about 40 wt. % of a surfactant.

10. A method according to claim 1 wherein the composition further comprises from 0 wt. % to about 60 wt. % of a builder.

11. A method according to claim 10 wherein the builder can be a citrate or citric acid.

* * * * *